(12) United States Patent
Cole et al.

(10) Patent No.: US 7,678,507 B2
(45) Date of Patent: Mar. 16, 2010

(54) LATENT HOLOGRAPHIC MEDIA AND METHOD

(75) Inventors: Michael C. Cole, Longmont, CO (US); Mark R. Ayres, Boulder, CO (US)

(73) Assignee: Inphase Technologies, Inc., Longmont, CO (US)

( * ) Notice: Subject to any disclaimer, the term of this patent is extended or adjusted under 35 U.S.C. 154(b) by 972 days.

(21) Appl. No.: 11/333,527

(22) Filed: Jan. 18, 2006

(65) Prior Publication Data

US 2007/0166625 A1 Jul. 19, 2007

(51) Int. Cl.
*G03H 1/04* (2006.01)
(52) U.S. Cl. ............................ 430/1; 430/2; 430/280.1; 430/281.1; 359/3
(58) Field of Classification Search .................. None
See application file for complete search history.

(56) References Cited

U.S. PATENT DOCUMENTS

| | | | | |
|---|---|---|---|---|
| 4,187,111 | A * | 2/1980 | Chandross et al. | 430/2 |
| 4,842,968 | A * | 6/1989 | Kojima et al. | 430/1 |
| 6,489,065 | B1 * | 12/2002 | Dhal et al. | 430/2 |
| 7,270,916 | B2 * | 9/2007 | Kihara et al. | 430/2 |
| 2003/0129501 | A1 * | 7/2003 | Megens et al. | 430/1 |
| 2003/0224250 | A1 * | 12/2003 | Setthachayanon et al. | 430/1 |
| 2004/0027625 | A1 * | 2/2004 | Trentler et al. | 359/3 |
| 2004/0245432 | A1 * | 12/2004 | Takizawa | 250/208.1 |
| 2005/0046915 | A1 * | 3/2005 | Takizawa et al. | 359/3 |
| 2005/0058910 | A1 * | 3/2005 | Takizawa et al. | 430/1 |
| 2005/0182148 | A1 * | 8/2005 | Gaud et al. | 522/1 |
| 2005/0214650 | A1 * | 9/2005 | Takizawa et al. | 430/1 |

OTHER PUBLICATIONS

Veniaminov et al., "Diffusional enhancement of holograms: phenanthrenequinone in polycarbonate", J. Opt. A:pure Appl. Opt., vol. 4 pp. 387-392 (2002).*
Steckman et al., "Holographic recording in a photopolymer by optically induced detachment of chromophores", Opt. Lett., vol. 25(9) pp. 607-609 (May 2000).*
Andreeva et al. "transmissive vol. holograms in a polymeric medium with phenanthroquinine", J. Opt. Technol. , vol. 67(12) pp. 1043-1048 (2000).*
Carlblom et al., "Photoinititated polymerization of methyl methacrylate . . . ", J. Polym. Sci., polymer. Chem. Ed., vol. 15 pp. 1381-1391 (1977).*

* cited by examiner

*Primary Examiner*—Martin J Angebranndt
(74) *Attorney, Agent, or Firm*—Morrison & Foerster LLP

(57) ABSTRACT

A holographic recording medium having a polymer matrix comprising a developer, wherein the holographic recording medium is capable of recording a latent hologram and the developer is capable of developing the latent hologram into a readable hologram by activation of the developer is disclosed. The holographic recording medium is capable of storing large numbers of holograms in the same volume with better signal resolution than previous holographic media by first recording a multitude of latent (or very weak) holograms in the same volume of space, then applying preferably a non-chemical fixing step to develop the latent holograms into readable holograms. The holographic recording medium and method of this invention cause the holograms to increase in diffraction efficiency, thus preventing complications caused during recording of holograms whereby previously recorded holograms interfere with latter recorded holograms in the same volume of space within the media.

11 Claims, 1 Drawing Sheet

LATENT HOLOGRAPHIC MEDIA AND METHOD

FIELD OF THE INVENTION

The invention relates to latent holographic recording medium and a method for manufacturing the same. In addition the invention relates to the precursors, particularly fast reaction precursor system for manufacturing latent holographic recording medium. The use of latent holographic medium and the precursors includes holographic optical data storage, optical lenses, beam steerers, and waveguides.

BACKGROUND

Developers of information storage devices and methods continue to seek increased storage capacity. As parts of this development, so-called page-wise memory systems, in particular holographic systems, have been suggested as alternatives to conventional memory devices.

In the typical holographic storage system, two coherent light beams are directed onto a storage medium. The first coherent light beam is a signal beam, which is used to encode data. The second coherent light beam is a reference light beam. The two coherent light beams intersect within the storage medium to produce an interference pattern.

The recorded information, stored as a holographic image, can be read by illuminating the holographic image with a reference beam. When the holographic image is illuminated with a reference beam at an appropriate angle, a signal beam containing the information stored is produced. Most often the appropriate angle for illuminating the holographic image will be the same as the angle of the reference beam used for recording the holographic image. More than one holographic image may be stored in the same volume by, for example, varying the angle of the reference beam during recording.

A hologram may be recorded in a medium as a variation of absorption or phase or both. A holographic recording material must respond to incident light pattern by causing a change in its optical properties. In the absorption or amplitude modulating materials, the absorption constant (or extinction coefficient) of the media changes as a result of exposure of the incident light, which is significantly absorbed in the medium. On the other hand, in phase modulating materials, the thickness or the refractive index changes due to the exposure. In the phase modulating materials there is generally very little absorption of light and the entire incident light is available for image formation. Thus, a phase modulating material can produce a higher efficiency than an amplitude modulating material. Also, in phase modulating media the amount of phase modulation could be made substantially large by tuning the refractive index changes in the material.

In early versions of holographic media, e.g., silver halide media, a latent image was first recorded in a silver halide emulsion. The latent images were then developed and fixed. During the development process the exposed silver halides in the emulsion are chemically reduced to metallic silver. The unexposed silver halide crystals remained in emulsion after development. These were still photosensitive and limited the life of the developed emulsion. They were removed by "fixing" with sodium thiosulphate (hypo), which formed a number of water-soluble silvery complexes along with a few water-insoluble complexes Such processes of the silver halide media involved use of chemicals and thin holographic media. Silver halide materials were the most popular choice of the early holographers for obvious reasons of high exposure sensitivity over a wide range of spectral wavelengths and high resolving power. These materials were suitable for transmission as well as reflection holograms, both of amplitude and phase type. A large number of developers, bleaches and processes have been reported for silver halide materials. However, silver halide materials were found to lack high dynamic range (ability to store data), had poor archival stability, and were difficult to work with because of the chemical processing needed to develop and fix the holograms.

More recently, a polymeric holographic medium has been the material of choice. A polymeric holographic medium records the interference pattern by changing its index of refraction to form an image of the interference pattern. Such photopolymers are capable of producing large index modulation and high diffraction efficiencies. Photopolymers do not require lengthy controlled processing techniques and can be naturally self developing (via diffusion processes) in situ and the fixation step could be accomplished by exposure to incoherent light. The photopolymer holograms are insensitive to environmental changes.

Photopolymers for holographic media represented a breakthrough, since media could then be framed between two hard substrates and also be made to any thickness. The result was holographic media with high dynamic range, good sensitivity, excellent shelf and archival life, and ease of manufacturing. Media such as this is described in U.S. Pat. No. 6,482,551 (incorporated herein by reference). This class of media is ideally suited for high density holographic data storage, and much progress has been made in the field of holographic data storage using photopolymeric media.

However, the ability of the photopolymer class of holographic media to self develop does result in a problem when large numbers of holograms are recorded into the same volume (which is required for high density data storage). Each recorded hologram in the photopolymer matrix is a spatial refractive index change in the media. Thus, as more and more holograms are written to the same volume of space, a very complex pattern of spatial refractive index is created within the photopolymer matrix. Ideally, the recording of later holograms in this same volume should not interact with the previously recorded holograms (this is generally true for a small number of multiplexed holograms). In practice though, as more holograms are recorded into the same volume, the recording of later holograms is affected by the existing holograms. With each additional recorded hologram, the media becomes more spatially inhomogeneous with respect to light transmission. This spatial inhomogeneity (or modulation) causes the later writing beams to diffract, creating undesired optical noise that in turn writes undesired modulation components into the photosensitive medium, e.g., the photopolymer matrix. This recording of secondary diffracted light can be a significant cause of signal degradation, and therefore, diminished storage density. Furthermore, light diffracted from the secondary modulation will record tertiary modulation and so on, so that many orders of rediffracted noise light are created and recorded.

In short, the capabilities of holographic storage systems are limited in part by the storage media. No single material possessed all the requirements of a holographic material. Thus, there is a need for material that would have the high sensitivity and latent image of silver halides while at the same time having the high diffraction efficiency and index modulation capabilities of photopolymers.

SUMMARY OF THE INVENTION

This invention describes a new holographic recording media capable of storing large numbers of holograms in the same volume with better signal resolution than previous holographic media by first recording a multitude of latent (or very weak) holograms in the same volume of space, then applying a nonchemical fixing step which causes the holograms to increase in diffraction efficiency, thus preventing complications caused during recording of holograms where by previously recorded holograms interfere with latter recorded holograms in the same volume of space kith in the media.

DETAILED DESCRIPTION

Figure 1:
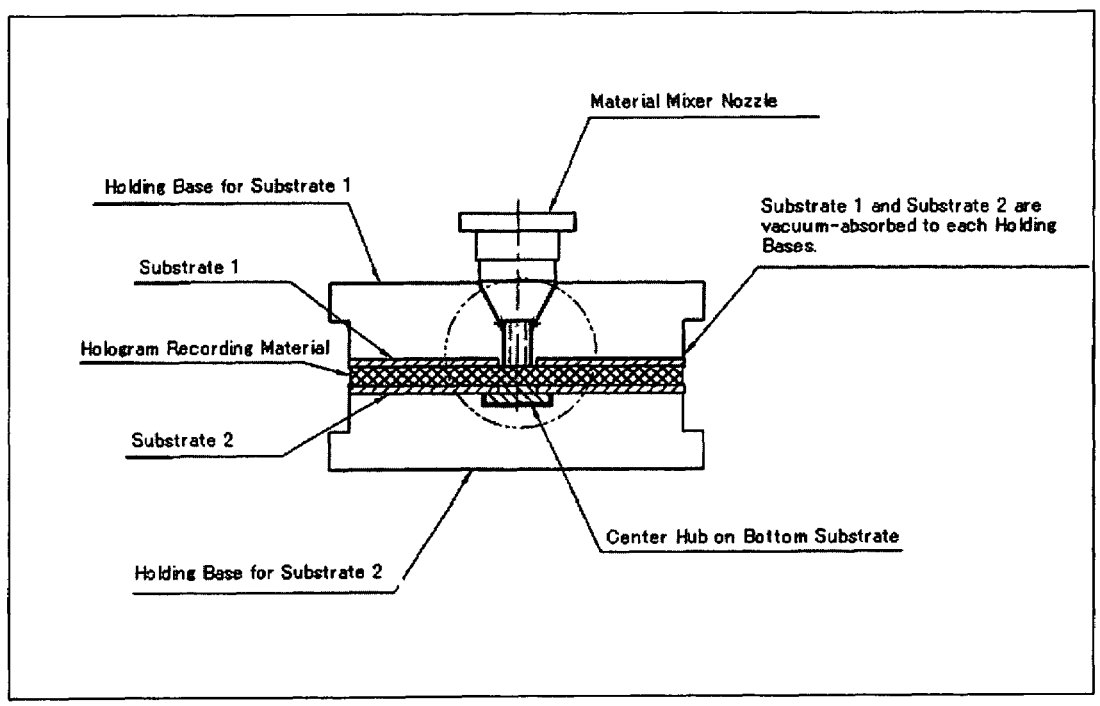
FIG. 1 is a schematic view showing the structure of an embodiment of the injection molding-type apparatus for forming a laminated holographic article.

In conventional photopolymer medium, as explained in the Background, during recording of a multiplexed set of holograms; the light diffracting from previously recorded holograms in a given volume of media can record undesired noise gratings. This process can manifest itself in several ways:

1) Multiplexing cross talk. Although the multiplexing scheme is designed to minimize the interaction of a reference beam with non-associated holograms (typically by Bragg selectivity), some cross talk does occur. Thus, when a hologram is written, its reference beam will diffract weakly off of any other holograms that already exist in the medium. As more holograms are recorded to a given volume of the medium, the amount of light diffracted off the previously recorded holograms increases, the diffracted light is recorded as noise.

2) Intra-object modulation: In order to achieve high storage densities, the object beam must be densely modulated. In a page-based system, for example, each 'on' data pixel in the object beam will write a weak inter-pixel grating with every other 'on' pixel. Thus, object beam components will be Bragg matched to the inter-pixel gratings of every hologram that already exists in the medium.

3) Bulk-index modulation: If the average exposure pattern constituting the interference of the reference and/or object beam is not uniform, some areas will be systematically exposed to more light than others, and hence an average index of refraction difference will develop. This in turn causes a distortion, or 'lensing,' of the wavefronts constituting the later writing beams. Therefore, as a standard photopolymer medium self develops during the recording of holograms, the medium will lens the light causing distortion in the recorded holograms that follow.

4) Self-focusing: High dynamic range holographic media suitable for high-density storage acts as a non-linear medium, which is susceptible to the phenomenon of self-focusing. If the medium responds to light by increasing it's refractive index ("positive" media), then any small bright perturbation in an otherwise uniform beam will create a local index increase. This increase will in turn refract more light into the local bright perturbation. If the dynamic range is sufficiently high, any intensity perturbation will eventually cause a complete collapse of a uniform beam into one or more focused filaments. ("Negative" media suffers from the analogous problem of "self defocusing.")

The inventors recognized that media with low dynamic range does not manifest the above described problems since the media has a smaller change in refractive index; yet, media with high dynamic range such as conventional photopolymer matrix medium does manifest the above described problems. In effect, the inventors found that as the dynamic range of the media increases, there appeared to be a diminishing return in the data storage capacity due to increased noise.

The invention described herein solves the above paradox by separating the hologram development step from the recording process, which allows for high dynamic range media without the problems currently associated with high dynamic range media.

The following portion of the specification includes definitions of selected terms used throughout the disclosure. The definitions include examples of various embodiments and/or forms of components that fall within the scope of a term and that may be: used for implementation. Of course, the examples are not intended to be limiting and other embodiments may be implemented. Both singular and plural forms of all terms fall within each meaning:

Low Dynamic Range Media—Media with a dynamic range under an M/#=4 in a 200 micron thick film (this measure is somewhat arbitrary and potentially may vary).

Light source—For the purposes of the present invention, the term "light source" refers to any source of electromagnetic radiation of any wavelength. In one embodiment, the light source of the present invention is a laser of a particular wavelength.

Recording—For the purposes of the present invention, the term "recording data" or even "recording" refers to chemically storing the spatial light intensity profile, sometimes as holographic representations of one or more pages. "Record" and "recorded" refer to the same basic definition as "recording".

Pages—For the purposes of the present invention, the term "data page" or "page" refers to the conventional meaning of data page as used with respect to holography. For example, a data page may be a page of data, one or more pictures, etc. to be recorded to a holographic storage medium, such as an article of the present invention.

Latent Hologram—Ideally a "latent hologram" is a hologram that cannot be read right after recording (or has a very weak diffraction just above the noise level). It would need to be developed before it could be read efficiently and with high signal to noise. Practically, the latent hologram is some fraction of the final developed hologram; preferebly 80% or less, more preferably 40% or less, most preferably less than 10%.

Read—When in reference to holography, "read" refers to the process of recalling a recorded hologram or the process of diffraction from formed gratings (holographic or otherwise).

Media—This term refers to only the chemistry that records the hologram and not substrates, antireflective coatings, or other physical entities which may make up an article or a holographic article. For the purposes of this invention, "media" at least includes a polymeric matrix (thermoset or thermoplastic) and light sensitive components capable of recording spatial light intensity profiles.

Holographic article—This term refers to an article which incorporates media as well as any of the following (either independently or in combinations): substrates, antireflective coatings, edge seals, mechanical framing, cartridges, labeling, etc.

Article—same constituents as a Holographic Article, however, the use of the article encompasses all possible uses such as holographic, gradient refractive index materials, waveguides, photolithography, etc.

Medium—This term can refer to either an article, a holographic article, or media.

Thermoplastic—For the purposes of the present invention, the term "thermoplastic" refers to the conventional meaning of thermoplastic, i.e., a compound substance that exhibits the property of a material, such as a high polymer, that softens when exposed to heat and generally returns to its original condition when cooled to room temperature. Examples of thermoplastics include, but are not limited to: poly(methyl vinyl ether-alt-maleic anhydride), poly(vinyl acetate), poly(styrene), poly(propylene), poly(ethylene oxide), linear nylons, linear polyesters, linear polycarbonates, linear polyurethanes, etc.

Monomer—refers to monomers capable of polymerization via free radical, cationic, and/or anionic mechanisms. In general, the term may refer to a mixture of different monomers. The monomers may be monofunctional, difunctional, or polyfunctional (in regards to the functionality capable of polymerization). In the present invention, monomers may contain one or more attachment functionalities, and the attachment functionalities may all be the same type or may be of different types from one another. Sometimes referred to as the photoactive monomer(s) to distinguish it from matrix forming materials which can sometimes be monomers prior to matrix formation.

Oligomer—For the purposes of the present invention, the term "oligomer" refers to a polymer having approximately 30 repeat units or less or any large molecule able to diffuse at least 100 nm in approximately 2 minutes at room temperature when dissolved in the article of the present invention. Such oligomers may contain one or more polymerizable groups whereby the polymerizable groups may be the same or different from other possible monomers in the polymerizable component. Furthermore, when more than one polymerizable group is present on the oligomer, they may be the same or different. Oligomers may also contain one or more attachment functionalities. Additionally, oligomers may be dendritic.

Matrix—the matrix is of polymeric (organic and/or inorganic) content and may be thermoplastic or thermoset.

Photoinitiator—For the purpose of the present invention, the term "photoinitiator" refers to the conventional meaning of the term photoinitiator and also refers to sensitizers and dyes. In general, a photoinitiator causes the curing of a material, such as a photoactive monomer, when the material containing the photoinitiator is exposed to light of a wavelength that activates the photoinitiator. The photoinitiator may refer to a combination of components, some of which individually are not light sensitive, yet in combination are capable of curing the photoactive monomer; examples are dye/amine, sensitizer/iodonium salt, dye/borate salt, etc.

Developer—a chemical or mixture of chemicals which upon activation either covalently or noncovalently bonds with one or more attachment functionalities (sometimes located on the monomer, sometimes located elsewhere). The "activation step" involves the use of an energy source. The developer could be of either of higher or of lower refractive index compared to the matrix and is specifically used to change the refractive index of areas exposed to light.

Attachment functionalities—refers to chemical functionalities which will bond with a developer, after an activation step.

Activation—Activation is the process whereby the developer (via the action of heat, light, microwave, sonication, or other energy source) becomes reactive towards bonding with attachment functionalities.

Bonding—Represents the conventional chemistry use of this term; wherein covalent, ionic, dipole-dipole, dipole-induced dipole, coordinate, etc. . . . types of bonding are possible.

Photoactive chemical—one or more chemicals whereupon light causes the "photoactive chemical" to bond with the matrix at reactive sites. Photoactive chemicals either contain or generate attachment functionalities.

Reactive sites—Chemical functionality on the matrix (pendant or in chain) that bonds with the photoactive chemical upon irradiation with appropriate wavelengths of light.

Energy source—refers to heat, light, microwaves, acoustic waves (as in sonication), all forms of electromagnetic radiation, particle radiations (alpha, beta, neutron, etc.), etc.

Photoactive matrix—refers to a matrix with functionalities attached (in chain or pendant), which become activated towards binding with a developer when exposed to light.

Flood Cure—the process of irradiating either part or the whole of the media in order to react with all photoinitiator, monomer, photoactive chemicals, etc. Flood cures can occur in stages, for instance there may be a preflood cure (often referred to as a precure) to eliminate inhibitors, a post record flood cure to use up remaining monomer and/or photoinitiator, a development flood cure whereby the development of the hologram occurs, etc. . . . All such flood stages may be at the same or different wavelengths of light depending on the application.

Optically flat—Refers to the ability of an incident beam of light to travel through the article and travel the same optical distance with less than $\lambda/2$ difference in optical path length of any given part of said incident light. An article of the present invention may be made optically flat via the appropriate processes, such as the process described in U.S. Pat. No. 5,932,045, the entire contents and disclosure of which is hereby incorporated by reference.

Latent Attachment Sites—Functionality that requires electromagnetic radiation (of which the latent attachment site absorbs) to become an active "attachment functionality" as defined earlier. In the absence of light (to which it is sensitive), it remains inert towards bonding with the developer even after an Activation step.

Photoreversible—For the purpose of this invention, the term "photoreversible" and sometimes "reversible" refers to materials such as photochromics, photorefractives, and material that undergo photodimerizations (2+2 or 4+4), using two different wavelengths of light or light and a different energy source for the forward and reverse reactions.

Inert diffusing agent—Compounds of refractive index different than the matrix, either higher or lower, that are inert to any polymerization, photoreaction, or other chemical reactions that may take place inside the media, yet typically diffuse away from were polymerization occurs or even where development occurs. In effect, such compounds are excluded from areas where polymerization or development occurred, thus providing the ability to increase the refractive index contrast between the formed photopolymer or developer and the bulk material of the matrix.

Dynamic range—It refers to the total response of the medium when it is divided up among many holograms multiplexed in a common volume of material; it is often parameterized as a quantity known as M/# (pronounced "M-number"). Dynamic range has a strong impact on the data storage density that can be achieved. For example, to reach a density of 100 bits/$\mu m^2$ (64 Gb/in.$^2$) with megapixel data pages, a target diffraction efficiency of $3\times10^{-5}$, and area at the medium of 0.1 cm$^2$ would require M/#=5. The M/# is a measure of the dynamic range of the recording material. The M/# is measured by multiplexing a series of holograms with exposure times set to consume all of the photoactive materials in the media. The M/# is then the sum of the square roots of the diffraction efficiencies of all of the multiplexed holograms. The M/# depends on the thickness of the media.

Sensitivity—It refers to the extent of refractive index modulation produced per unit exposure (energy per unit area). The sensitivity is measured by the cumulative exposure time required to reach 80% of the total M/# of the recording medium. The higher the sensitivity of the material, the shorter the cumulative exposure time required to reach 80% of the total M/# (for a given exposure energy).

Shrinkage—The shrinkage (occurring primarily in the thickness of the medium) is determined by measuring the Bragg detuning (the shift in the readout angle) of the angle multiplexed holograms. The quantitative relationship between the physical shrinkage of the material and the Bragg detuning is described in detail in Applied Physics Letters, Volume 73, Number 10, p. 1337-1339, 7 Sep. 1998.

Diffraction efficiency ($\eta$)—In the general case, it is determined by the ratio of the power of the diffracted light beam $P_{diff}$ to the incident power $P_{inc}$ of the beam given by the following relationship:

$$\eta = P_{diff}/P_{inc}$$

Diffraction efficiency (and thus the readout signal) could be proportional to the square of the index modulation times the thickness.

High performance holographic recording articles are characterized by low shrinkage, high dynamic range, and high sensitivity. Low shrinkage will assure non-degradation of the recorded holograms and total fidelity of the holographic data to be recovered. Low shrinkage in the range of less than 0.3% is required for high density data storage applications. The dynamic range of a holographic recording medium is typically characterized by the parameter, M/#, a measure of how many holograms of a given average diffraction efficiency can be stored in a common volume. The M/# is determined by both the refractive index contrast and thickness of a medium. Typical values of M/# are 1.5 (for 100 microns) or better. The photosensitivity is characterized by the total exposure time required to consume the dynamic range of the media. The sensitivity can be in the range of 5 to 600 seconds (dependent on the laser power).

Details of the measurements of the recording-induced shrinkage, M/#/200 µm, and sensitivity are described in detail in Applied Physics Letters, Volume 73, Number 10, p. 1337-1339, 7 Sep. 1998, which is incorporated herein by reference.

The optical article, e.g., holographic data recording medium, of the invention is formed by steps including mixing a matrix precursor and a photoactive monomer or chemical and a developer, curing the precursor material to form the matrix, recording the holograms in the matrix and subsequently developing the recorded holograms. The matrix precursor, photoactive monomer/chemical and developer are selected such that the following conditions are preferentially met by the system. (1) The system is a "three-chemistry system" such that the reaction by which the matrix precursor is polymerized during the cure is independent from the reaction during writing of a hologram pattern, e.g., data, which in turn, is independent from the reaction during developing of the hologram. (2) The matrix polymer and the polymer resulting from polymerization of the photoactive monomer/chemical in regions having holograms patterns (photopolymer regions) are compatible with each other. The matrix is considered to be formed when the photorecording material, i.e., the matrix material plus the photoactive monomer/chemical, photoinitiator, developer and/or other additives, exhibits an elastic modulus of at least about $10^5$ Pa, generally about $10^5$ Pa to about $10^9$ Pa, advantageously about $10^6$ Pa to about $10^8$ Pa. The compatibility of the matrix polymer and photopolymer tends to prevent large-scale (>100 nm) phase separation of the components, such large-scale phase separation typically leading to undesirable haziness or opacity.

This invention relates to a so-called two-liquid solidifying process, the equipment and precursor material for such a process, wherein the precursor material is polymerized into a solidified material through a chemical reaction initiated by mixing a plurality of liquid constituents. By the process and system of this invention, it is easy to thicken the precursor material layer and form a sandwich structure because the need for a drying step is eliminated.

FIG. 1 is a schematic view showing the structure of an embodiment of the injection molding-type apparatus for forming a laminated holographic recording media. As shown in FIG. 1, the apparatus is composed of a holding base for a first holographic recording medium substrate (hereafter, simply referred to as substrate 1) with a through-hole formed on it, a holding base for a second holographic recording medium substrate (hereafter, simply referred to as substrate 2) being placed opposed to the substrate 1, and a dynamic mixer for supplying a mixed precursor material.

A through-hole has been formed on the holding base for the substrate 1, through which the holographic material mixer and the substrate 1 with the through-hole formed on it can be connected.

Furthermore, a force for offsetting the weight of the base has been previously applied by means of a spring so that the holding base for the substrate 2 capable of moving upward while maintaining its parallelism may move upward through polymerization and contraction of the precursor material in fabricating the medium.

In manufacturing the holographic recording medium, the substrate 1 with the through-hole formed at its center is vacuum-absorbed to the holding base for the substrate 1. Then, the substrate 2 is vacuum-absorbed to the opposite holding base.

Preferably, the substrate 2 has no through-hole formed on it. However, if the substrate 2 has a through-hole formed on it in the same manner as that of the substrate 1, it is preferable that the through-hole be previously closed by means of a seal or stopper. Note that care should preferably be taken not to create a steep difference in height or a gap on a boundary between the area where the seal or stopper is put and the area where the precursor material is deposited, preventing bubbles from mixing into the injected precursor material.

In one embodiment, the sequence of steps in the method for manufacturing holographic recording media is described below. A dynamic mixer, which is used for mixing the two components of the precursor material, is inserted into the substrate 1 through a through-hole formed at the center of the holding base. The precursor material is filled into a clearance between the first and second substrates. The precursor material within the clearance is polymerized, while optionally, simultaneously the clearance is decreased to compensate for any contraction of the precursor material during polymerization.

The precursor material could be any of several material system(s) containing a material that initiates reaction when mixed with another chemical component and/or a material which reacts to a light beam.

The method of the present invention does not limit the precursor material system to those described herein and other precursor materials may be used including those which are composed of more than one component and have such a characteristic that they lose fluidity through chemical reaction initiated when being mixed even though they could have been in the liquid phase immediately after being mixed. Such a non-fluid precursor material could then be formed into a holographic recording media by photopolymerization in the non-fluid cured precursor material shaped in the desired shape even though the cured precursor material has substantially no fluidity.

At the point where the reaction progresses and the precursor material solidifies, the object combining substrates 1 and 2 with the solidified product of the precursor material is removed from the mold for the use as a disk, for example. The recording medium is not limited to the disk-shaped ones and may be used, for example, in the form of card or a currency note.

Examples of polymerization reactions contemplated for forming matrix polymers in the invention include isocyanate-hydroxyl step polymerization (urethane formation), isocyanate-amine step polymerization (urea formation), cationic epoxy polymerization, cationic vinyl ether polymerization, cationic alkenyl ether polymerization, cationic allene ether polymerization, cationic ketene acetal polymerization, epoxy-amine step polymerization, epoxy-mercaptan step polymerization, unsaturated ester-amine step polymerization (via Michael addition), unsaturated ester-mercaptan step polymerization (via Michael addition), and vinyl-silicon hydride step polymerization (hydrosilylation).

Several such reactions are enabled or accelerated by suitable catalysts. For example, cationic epoxy polymerization takes place rapidly at room temperature by use of $BF_3$-based catalysts, other cationic polymerizations proceed in the presence of protons, epoxy-mercaptan reactions and Michael additions are accelerated by bases such as amines, hydrosilylation proceeds rapidly in the presence of transition metal catalysts such as platinum, and urethane and urea formation proceed rapidly when tin catalysts are employed. It is also possible to use photogenerated catalysts for matrix formation, provided that steps are taken to prevent polymerization of the photoactive monomer during the photogeneration.

The photoactive monomer is any monomer or monomers capable of undergoing photoinitiated polymerization, and which, in combination with a matrix material, meets the polymerization reaction and compatibility requirements of the invention. Suitable photoactive monomers include those which polymerize by a free-radical reaction, e.g., molecules containing ethylenic unsaturation such as acrylates, methacrylates, acrylamides, methacrylamides, styrene, substituted styrenes, vinyl naphthalene, substituted vinyl naphthalenes, and other vinyl derivatives. Free-radical copolymerizable pair systems such as vinyl ether mixed with maleate and thiol mixed with olefin are also suitable. It is also possible to use cationically polymerizable systems such as vinyl ethers, alkenyl ethers, allene ethers, ketene acetals, and epoxies. It is also possible for a single photoactive monomer molecule to contain more than one monomer functional group. Oligomers may also be used, wherein the oligomer is considered a short polymer and in some cases can contain functional groups that make it a monomer. So that, an oligomer can be a very large monomer and thus have all the same characteristics as described for a monomer. It is also understood that both monomers and oligomers can be dendrimeric, which is a descriptor used to describe the shape of the monomer/oligomer. These monomers could be used as by themselves or in combination in a mixture.

In general, the monomers of this invention will contain few, if any, index-contrasting moieties. Instead, the preferred location of index-contrasting moieties is on the developer. Whereon, multiple index-contrasting moieties may be present.

Typically, 0.1 to 20 vol. % photoactive monomer, based on the volume of the precursor material, provides desirable results. The preferred acrylate monomers are a mixture of mono and difunctional monomers. Some example monomers are benzophenone acrylate; dimethyl ethyl amine acrylate; thioether acrylate; tetrahydrofurfurylacrylate; 1-vinyl-2-pyrrolidinone; 2-phenoxyethylacrylate; and the like. Some or all of the photoactive monomers may have attachment functionalities and in general will not be of high refractive index.

The developer is any molecule, oligomer, or even polymer that has the ability to react with an attachment functionality after an energy source (such as light) has been applied. Thus, an attachment functionality such as an anhydride could have as a reactant on the developer a photogenerated amine, hydroxyl, mercaptan, or other nucleophile, or a photogenerated acid. All of these reactants (once formed by an energy source would form covalent or noncovalent bonds with the anhydride. Of course, the anhydride is just one possible, of many possibilities, for the attachment functionality. It is important to distinguish the developer from the reactive group that it uses to attach to the attachment functionality, since a given developer may have more than one type of attachment functionality on it, and there may be more than one developer present. In general, the developer will contain one or more index-contrasting groups. Oligomeric materials make very good developers. Some example oligomers that are useful for building large refractive index change (and are thus well suited for use as a developer) are oligomeric (ethylene sulfide) dithiol, oligomeric (phenylene sulfide) dithiol, oligomeric (bisphenol A), and oligomeric (bisphenol A) diacrylate. Preferably, the refractive index of the developer is greater than 1.5. More preferably, the refractive index of the developer is greater than 1.8. Typically, 1 to 20 vol. % developer, based on the volume of the precursor material, provides desirable results.

Preferably, the developer is one or a mixture of the following types: photoacid generator, photobase generator, free radical initiator, chromophores capable of electron transfer, borate salts, peroxides, disulfides, anthracenes, acenaphthylenes, spyropyrans, latent bases, latent acids, inorganic salts, organic salts, coumarins, maleimides, maleates, anhydrides, epoxides, acrylates, vinyl ethers, vinyl amides, styrenes, and vinyl sulfides. Preferably, the developer is activated to bond with the attachment functionality by application of an energy source. Preferably, the energy source is one or a combination of the following: heat, electromagnetic energy, sonication, and particle radiation. Preferably, the electromagnetic energy is of a wavelength different from that used for recording. Preferably, the refractive index of the recorded areas increases or decreases upon developing. Optionally, the change in refractive index is reversible, permanent, or temporary (preferably permanent for data storage for applications).

In some embodiments, a photoactive chemical is used. In such embodiments, the matrix has functionality (such as pendant vinyl ethers) to which the photoactive chemical (such as a typical photoinitiator) will covalently bond when exposed to an appropriate wavelength of light. The photoactive chemical also contains attachment functionalities to which a developer can later react when the proper energy source for the development step is used. Similar to the monomer, few index contrasting groups are present on the photoactive chemical.

In such embodiments, the photoactive chemical is typically present at 0.1 to 20 volume percent, based on precursor volume.

In addition to the photoactive monomer/chemical and developer, the optical article could contain a photoinitiator. The photoinitiator, upon exposure to relatively low levels of the recording light, chemically initiates the polymerization of the monomer, avoiding the need for direct light-induced polymerization of the monomer. The photoinitiator generally should offer a source of species that initiate polymerization of the particular photoactive monomer. About 0.1 to 20 vol % photoinitiator, based on the volume of the precursor material, provides desirable results.

A variety of photoinitiators known to those skilled in the art and available commercially are suitable for use in the invention. It is advantageous to use a photoinitiator that is sensitive to light in the visible part of the spectrum, particularly at wavelengths available from conventional laser sources, e.g., the blue and green lines of Ar+ (458, 488, 514 nm) and He—Cd lasers (442 nm), the green line of frequency doubled YAG lasers (532 nm), and the red lines of He—Ne (633 nm) and Kr+lasers (647 and 676 nm). One advantageous free radical photoinitiator is bis($\eta$-5-2,4-cyclopentadien-1-yl)bis[2,6-difluoro-3-(1H-pyrrol-1-yl)phenyl]titanium, available commercially from Ciba as Irgacure-784. Another visible free-radical photoinitiator (which requires a co-initiator) is 5,7,diiodo-3-butoxy-6-fluorone, commercially available from Spectra Group Limited as H-Nu 470. Free-radical photoinitiators of dye-hydrogen donor systems are also possible. Examples of suitable dyes include eosin, rose bengal, erythrosine, and methylene blue, and suitable hydrogen donors include tertiary amines such as n-methyl diethanol amine. In the case of cationically polymerizable monomers, a cationic photoinitiator is used, such as a sulfonium salt or an iodonium salt. These cationic photoinitiator salts absorb predominantly in the UV portion of the spectrum, and are therefore typically sensitized with a dye to allow use of the visible portion of the spectrum. An example of an alternative visible cationic photoinitiator is ($\eta_5$-2,4-cyclopentadien-1-yl) ($\eta_6$-isopropylbenzene)-iron(II) hexafluorophosphate, available commercial from Ciba as Irgacure 261.

Preferably, the photoinitiators are selected according to their sensitivity to the light sources. For example, Irgacure 369, Irgacure 819, and Irgacure 907, OxE01 are suitable for commercial blue laser systems. Irgacure-784 is suitable for green laser systems, and CB-650 or methylene blue (with a donor) is suitable for red laser systems. Irgacure products and OxE01 are available from Ciba; CB-650 is available from the Spectra Group.

Advantageously, for holographic recording, the matrix is a polymer formed by isocyanate-hydroxyl step polymerization, more advantageously a polymer formed by isocyanate-hydroxyl step polymerization having a polyether backbone. The polyether backbone offers desirable compatibility with several useful index contrasting groups, particularly aromatic compounds. Specifically, indexing contrasting groups selected from benzene, halogenated benzenes, naphthylenes, and thionaphthalenes have been found to be compatible with matrix polymers formed by isocyanate-hydroxyl step polymerization and having a polyether backbone.

For independent reactions of the polymerization of the matrix precursor, of the recording step and of the developing step, the reactions are selected such that: (a) the reactions proceed by different types of reaction intermediates, (b) neither the intermediate nor the conditions by which the precursor material is polymerized will induce substantial polymerization of the photoactive monomer/chemical functional groups, and (c) neither the intermediate nor the conditions by which the precursor material is polymerized will induce a reaction of the monomer/chemical functional groups with the developer.

For purposes of the invention, polymers are considered to be compatible if a blend of the polymers is characterized, in 90° light scattering, by a Rayleigh ratio ($R_{90°}$) less than $7 \times 10^{-3}$ cm$^{-1}$. The Rayleigh ratio, $R_\theta$, is a conventionally known property, and is defined as the energy scattered by a unit volume in the direction $\theta$, per steradian, when a medium is illuminated with a unit intensity of unpolarized light, as discussed in M. Kerker, *The Scattering of Light and Other Electromagnetic Radiation*, Academic Press, San Diego, 1969.

A polymer blend is generally considered to be miscible if the blend exhibits a single glass transition temperature, $T_g$, as measured by conventional methods. An immiscible blend will typically exhibit two glass transition temperatures corresponding to the $T_g$ values of the individual polymers. $T_g$ testing is most commonly performed by differential scanning calorimetry (DSC), which shows the $T_g$ as a step change in the heat flow (typically the ordinate). The reported $T_g$ is typically the temperature at which the ordinate reaches the mid-point between extrapolated baselines before and after the transition. It is also possible to use Dynamic Mechanical Analysis (DMA) to measure $T_g$. DMA measures the storage modulus of a material, which drops several orders of magnitude in the glass transition region. It is possible in certain cases for the polymers of a blend to have individual $T_g$ values that are close to each other. In such cases, conventional methods for resolving such overlapping $T_g$ should be used, such as discussed in Brinke et al., "The thermal characterization of multi-component systems by enthalpy relaxation," *Thermochimica Acta.*, 238 (1994), at 75.

In all of the embodiments of the present invention, a polymeric matrix is required. The attributes of this polymeric matrix vary from application to application, such as thermoplastic or thermoset, high Tg or low Tg, high refractive index or low refractive index, etc. . . . Thus, one has to consider the applications before deciding what matrix properties are needed. For those skilled in the art of polymer chemistry, matching the needed polymeric properties to a particular polymeric matrix is usually straight forward, though some trial and error may be needed to refine various matrix attributes. Variables to be considered in choosing a matrix are $T_g$, melt temperature, solubility of components, inertness to reaction conditions used, scatter, birefringence, thermal degradation temperature, modulus, toughness, crosslink density, water/oxygen permeability, adhesion to substrates, diffusion rates of dissolved components, etc.

Additionally, the media may include additives such as plasticizers for altering the properties of the article of the present invention including the melting point, flexibility, toughness, diffusibility of the monomers, and ease of processibility. Examples of suitable plasticizers include dibutyl phthalate, dichlorohexane, N,N-dimethylformamide, etc. Plasticizers differ from solvents in that solvents are typically evaporated whereas plasticizers are meant to remain in the article. Other additives that are contemplated for ease of processing are antioxidants, mold release agents, antifoaming agents, and other conventional processing aides. Still other additives that are useful are pigments, polymerization inhibitors, UV absorbers, polymerization retarders, adhesion promoters, viscosifiers, solvents, fillers, dyes, oxidizers, catalysts, inert diffusing agents (diffuses in reverse to monomers in order to provide refractive index contrast), microwave/infrared absorbers, and chain transfer agents.

The media preferably comprising additives, one or multiple of the following: adhesion promoter(s), viscosifier(s), solvent(s), plasticizer(s), pigment(s), filler(s), release agent(s), dye(s), oxidizer(s), catalyst(s), antioxidant(s), inhibitor(s), retarder(s), chain transfer agents, inert diffusing agent(s), microwave/infrared absorber(s), and light stabilizers.

In one variation, the matrix is a thermoset. The thermoset is one or mixtures of the following: isocyanate/hydroxyl, isocyanate/mercaptan, isocyanate/amine, cyclic anhydride/hydroxyl, cyclic anhydride/mercaptan, cyclic anhydride/amine, epoxide/hydroxyl, epoxide/mercaptan, epoxide/amine, cyclic anhydride/epoxide, acrylate/mercaptan, vinyl ether/mercaptan, acid or base catalyzed epoxide, cationically cured vinyl ether, and anionic cured acrylate.

Preferably, the method of making thermoplastic holographic media is as follows: monomers, photoactive chemical(s), developer(s) and any optional additives are dissolved into the melted thermoplastic and mixed until homogenous, then the mixture is extruded. Preferably, the mixture is extruded into a mold, cooled, and then released. Preferably, the method of making thermoset holographic media is as follows: monomers, photoactive chemical(s), developer(s) and any optional additives are dissolved into the thermoset matrix precursors until homogenous, then mixture is deposited. Preferably, the mixture is deposited between two transparent substrates. Preferably, holograms are recorded in the media by exposing the media to light, recording spatial light intensities, and then exposing to an energy source to further develop the spatial light intensities as refractive index modulations.

Preferably, the attachment functionality is one or more of the following types: photoacid generator, photobase generator, free radical initiator, chromophores capable of electron transfer, borate salts, electron donors, electron acceptors, peroxides, disulfides, anthracenes, acenaphthylenes, spyropyrans, latent bases, latent acids, inorganic salts, organic salts, coumarins, maleimides, maleates, anhydrides, epoxides, acrylates, vinyl ethers, vinyl amides, styrenes, and vinyl sulfides.

For some embodiments, use of photocycloaddition reactions are described (for instance as a photoactive chemical); additionally, in yet other embodiments, the use of photoreversible cycloaddition reactions are described. For such embodiments, there are a variety of photocycloaddition reactions that yield rings of different sizes, and that may be reversed using light of shorter wavelength than the wavelength first used to react the components, or using heat. Four-member rings (cyclobutanes) may be formed by (2+2) cycloadditions, and 8-membered rings may be formed by (4+4) cycloadditions. Acenaphthylenes, which are an example of species that undergo (2+2) cycloaddition reactions, are a more preferred type of write component. Acenaphthylenes can be synthesized to have a large range of refractive indices and undergo forward and reverse reactions with high quantum efficiency and minimal side reactions. Further, the forward and reverse photoreactions are at wavelengths that are easily accessible with current laser and light sources. Preferably, the use of photocycloaddition for development should involve a high refractive index acenaphthylene, as this allows for the possibility of "undeveloping" the media with 290 nm light for applications where such a feature is desirable. Suitable photocycloaddition materials for reversible applications for use in such articles are described in U.S. patent application Ser. No. 10/411,380, filed Apr. 11, 2003, the entire contents and disclosure of which is hereby incorporated by reference. For the embodiments where reversibility is not needed, there are large numbers of photodimerization reactions known to those skilled in the art of photochemistry that can be used in this invention.

Preferably, the holographic recording layer is contained between substrates. Preferably, the substrates are plastic or glass or a combination of the two. Preferably, the substrates have antireflective coatings. Preferably, the media is substantially optically flat and is used for high-density data storage. Preferably, the high-density data storage is of the holographic kind and is either pagewise or bitwise type. Optionally, the media is used for photolithographic circuit making, 3D microstructured photopolymer photonic systems, a holographic optical element, beam steerer, wave guide, optical mirror, optical filter, display holograms.

For many of the embodiments of the present invention (especially holographic data storage embodiments), the media is fabricated into a holographic recording article. Typically, fabrication of the article involves depositing all needed components between two plates using, for example, a gasket to contain the mixture. The plates are typically glass, but it is also possible to use other materials transparent to the radiation used to record, e.g., a plastic such as polycarbonate or poly(methyl methacrylate). It is possible to use spacers between the plates to maintain a desired thickness for the recording medium. In applications requiring optical flatness, the melted mixture may shrink during cooling or curing and thus distort the optical flatness of the article. To reduce such effects, it is useful to place the article between plates in an apparatus containing mounts, e.g., vacuum chucks, capable of being adjusted in response to changes in parallelism and/or spacing. In such an apparatus, it is possible to monitor the parallelism in real-time by use of conventional interferometric methods, and to make any necessary adjustments to the heating/cooling process or curing times. Additionally, an article or substrate of the present invention may have an antireflective coating and/or be edge sealed to exclude water or oxygen. An antireflective coating may be deposited on an article or substrate by various processes such as chemical vapor deposition and an article or substrate may be edge sealed using known methods. The photorecording material of the present invention is also capable of being supported in other ways. More conventional polymer processing is also envisioned, e.g., closed mold formation or sheet extrusion. A stratified medium is also contemplated, i.e., a medium containing multiple substrates, e.g., glass, with layers of photorecording material disposed between the substrates.

A holographic recording article of the present invention is capable of being used in a holographic data storage system. The amount of information capable of being stored in holographic articles is proportional to the product of: the refractive index contrast, $\Delta n$, of the photorecording material, and the thickness, d, of the photorecording material. (The refractive index contrast, $\Delta n$, is conventionally known, and is defined as the amplitude of the sinusoidal variations in the refractive index of a material in which a plane-wave, volume hologram has been written. The refractive index varies as: $n(x)=n_0+\Delta n \cos(K_x)$, where $n(x)$ is the spatially varying refractive index, x is the position vector, K is the grating wave vector, and $n_0$ is the baseline refractive index of the medium. See, e.g., P. Hariharan, Optical Holography: Principles, Techniques and Applications, Cambridge University Press, Cambridge, 1991, at 44, the disclosure of which is hereby incorporated by reference.) The $\Delta n$ of a material is typically calculated from the diffraction efficiency or efficiencies of a single volume hologram or a multiplexed set of volume holograms recorded in a medium. The $\Delta n$ is associated with a medium before writing, but is observed by measurement performed after recording. Advantageously, the photorecording material of the invention exhibits a Δn of $3 \times 10^{-3}$ or higher after development.

Examples of other optical articles include beam filters, beam steerers or deflectors, and optical couplers. (See, e.g., L. Solymar and D. Cooke, Volume Holography and Volume Gratings, Academic Press, 315-327 (1981), the disclosure of which is hereby incorporated by reference.) A beam filter separates part of an incident laser beam that is traveling along a particular angle from the rest of the beam. Specifically, the Bragg selectivity of a thick transmission hologram is able to selectively diffract light along a particular angle of incidence, while light along other angles travels undeflected through the hologram. (See, e.g., J. E. Ludman et al., "Very thick holographic nonspatial filtering of laser beams," Optical Engineering, Vol. 36, No. 6, 1700 (1997), the disclosure of which is hereby incorporated by reference.) A beam steerer is a hologram that deflects light incident at the Bragg angle. An optical coupler is typically a combination of beam deflectors that steer light from a source to a target. These articles, typically referred to as holographic optical elements, are fabricated by imaging a particular optical interference pattern within a recording medium. Media/Articles for these holographic optical elements are capable of being formed by the techniques discussed herein for recording media or waveguides.

Further examples of other articles are optical transmission devices such as waveguides. Polymeric optical waveguides are discussed for example in B. L. Booth, "Optical Interconnection Polymers," in Polymers for Lightwave and Integrated Optics, Technology and Applications, L. A. Hornak, ed., Marcel Dekker, Inc. (1992); U.S. Pat. No. 5,292,620; and U.S. Pat. No. 5,219,710, the disclosures of which are hereby incorporated by reference. Essentially, the recording material of the present invention is irradiated in a desired waveguide pattern to provide refractive index contrast between the waveguide pattern and the surrounding (cladding) material. It is possible for exposure to be performed, for example, by a focused laser light or by use of a mask with a non-focused light source. Generally, a single layer is exposed in this manner to provide the waveguide pattern, and additional layers are added to complete the cladding, thereby completing the waveguide. This process is discussed for example at pages 235-36 of Booth, supra, and Cols. 5 and 6 of U.S. Pat. No. 5,292,620, the disclosure of which is hereby incorporated by reference. A benefit of the present invention is that by using conventional molding techniques, it is possible to mold thermoplastic mixtures into a variety of shapes prior to formation of the article by cooling to room temperature. For example, the thermoplastic can be molded into ridge waveguides, wherein refractive index patterns are then written into the molded structures. It is thereby possible to easily form structures such as Bragg gratings. This feature of the present invention increases the breadth of applications in which such polymeric waveguides would be useful.

Still further examples of possible optical articles other than holographic data storage are lithographic circuit waveguides. An article if this type is essentially an appropriate media placed in a transparent box, whereby a 3D optical circuit is drawn in the article. After recording the necessary elements of the circuit which include waveguides, diffraction gratings, partial mirrors, filters, etc. . . . , the article is then able to process optical information much like an electronic circuit is capable of processing electronic information.

Since an article of the present invention has so many potential uses, it is not limited by thickness, and thus an article of the present invention may be of any thickness and even of any form or shape; all of which is dictated solely by the intended use.

The media of this invention would be good for high density data storage, holographic optical elements, display holography, beam steerers, photolithography, light circuits, 3D microstructured photopolymer photonic systems, and other applications where recording of spatial light intensity or the formation of refractive index gradients is used.

The invention will be further clarified by the following embodiments and examples, which are intended to be exemplary.

Embodiment A is generally directed to media comprising at least one of each of the following components: a matrix, a monomer (and/or oligomer), a photoinitiator, and a developer. The monomer contains a functionality to which the developer attaches upon activation. Embodiment B is directed generally to holographic media comprising a polymeric matrix, photoactive chemical, and developer; wherein the photoactive chemical has attachment functionalities and the matrix has reactive groups to which the photoactive chemical binds upon irradiation with the appropriate wavelength of light. Holographic media of Embodiment C is generally directed to media comprising a photoactive matrix(ces) (which contain latent attachment sites) and developer(s). Holographic media of Embodiment D would be media capable of recording spatial light intensities comprising two or more of the following: polymeric matrix(matrices), photoinitiator(s), monomer(s)/oligomer(s), developer(s), photoactive chemical(s), and photoactive matrix(matrices); whereby, matrix attached polymerizable functionalities, reactive sites, latent attachment sites and attachment functionalities may be present.

In all the embodiments listed below (A through D), the basic principle in operation is the same. A hologram is recorded in the media chemically; these holograms either cannot be read out (because they do not offer an index change for diffraction of light) or are weakly diffracting. Then, upon use of an energy source; the developers react with the appropriate attachment functionalities, which cause the hologram to diffract light by creation of an index grating. In cases whereby a weak index grating was created during the recording process, the development step increases the index contrast leading to a stronger diffraction.

EMBODIMENT A

The preferred method used for making media of Embodiment A would be the following: Mix all chemical components (matrix or matrix precursor(s), monomer(s), photoinitiator(s), and developer(s)) together until homogeneous, then apply to substrate(s) or into mold(s). Optional packaging such as labeling, placing in a cartridge, etc. can then be performed. Substrates may already have antireflective coatings, labels, or tracking patterns already present.

The preferred method used for exposing media of embodiment A is the following: An article of media of Embodiment A, is exposed to light, to which it is sensitive. During this light exposure, photopolymerization occurs which chemically records the spatial light intensity distribution. A hologram capable of being read may or may not be present at this stage. Once the exposure schedule is completed (which may include a blanket irradiation step in which any unused monomer is reacted as much as possible), the recorded area is exposed to an energy source (as the activation step) such that the developer is activated. The developer(s) then increase/decreases the diffraction efficiency of the chemically recorded spatial light intensity. Certain variations of this embodiment would allow for erasable and rewriteable media.

In Embodiment A, the matrix primarily functions as a mechanical support, and as such may contain polymerizable functionalities capable of copolymerizing with the monomer(s)/oligomer(s). The matrix may be of any polymeric material assuming that all components are soluble with in the matrix. Additionally, the matrix may or may not be crosslinked. The monomer may be any polymerizable monomer and may be multifunctional and additionally may be a mixture of monomers; however, some (or all) of the monomer(s) will contain an attachment functionality that allow for bonding with a developer (preferably after an Activation step). The monomer is preferably of a refractive index that is near that of the matrix. More preferably, the monomer is of a refractive index that is the same as the matrix, and most preferably, the monomer has a refractive index that is slightly less than the matrix. A photoinitiator is also present and is chosen such that sensitivity to a particular wavelength (or wavelengths) of light is achieved. The developer is of a refractive index that greatly differs from the matrix. Preferably, the developer is of higher refractive index than the matrix. More preferably, the developer has a greater than 0.1 in difference in refractive index (for example, if the matrix is 1.45, then the developer has a refractive index of 1.55). Most preferably, the developer has a refractive index between 0.2 and 3.0 greater than the matrix. Additionally, other chemicals such as pigments, adhesion promoters, oxidizers, plasticizers, antioxidants, etc. may be present.

Upon irradiation with light of the correct wavelength (coherent or otherwise depending on the application), the photoinitiator initiates polymerization of the monomer(s), this polymerizes to form polymer. Upon completion of the irradiation, an optional flood cure step may be used if it is necessary to use up remaining monomer and photoinitiator. If holograms were recorded, reading of the holograms may or may not be possible depending on the refractive index of the monomer(s) used. In the ideal scenario, the monomer(s) would be chosen such that the polymer formed would have the same refractive index or slightly less refractive index as the matrix. The hologram would then be a latent hologram, unable to be read. Yet exposure to a second wavelength of light (or other energy source) causes the developer to bond with the photopolymer formed during the $1^{st}$ irradiation. This bonding of the developer alters the refractive index of the photopolymer, thus increasing the refractive index contrast between the grating and the surrounding matrix. In effect, the hologram(s) is then able to diffract light, or if it was already able to diffract light, it would then be able to diffract more light; both of which lead to an increased readout efficiency. After completion of a development step, the holograms can then be read out in a normal manner.

One example of a formulation of Embodiment A is the following formulation: Matrix components include 1.48 g Desmodur N3200 (triisocyanate obtained from Bayer); 2.84 g Glycerol Propoxylate Mn 1500 (triol obtained from Aldrich Chemical Company); 0.288 g Hydroxypropyl acrylate (allows for covalent bonding of the photopolymer to the matrix during recording); monomer is 0.098 g Benzophenone acrylate; Photoinitiator is 0.009 g Triphenyl Phosphine Oxide (Obtained from Ciba-Giegy as Darocure TPO); additives include 0.099 g N,N-dimethyl formamide (plasticizer and solvent for various components); 0.002 g dibutyl tin dilaurate (catalyst for isocyanate reaction with hydroxyls—matrix cure); and developer is 0.0699 g CGI 909 Borate Salt (Chlorinated Borate Salt obtained from Ciba-Giegy).

All components were mixed until a clear homogenous liquid was obtained, then the liquid was degassed under vacuum for 1 minute. The liquid was then sandwiched between two glass substrates using spacers of 250 micron thickness to achieve a uniform thickness. On the next day the articles were examined; the matrix had cured to a crosslinked matrix. The absorbance of the article at 407 nm was 3.8% Abs.

To this article, a set of 31 holograms was multiplexed into the media. The sample was then read, and an M/#/200 microns of 2.64 was measured. The article was then subjected to ultraviolet light from a Rayonette Light Reactor using 16 360 nm bulbs for 1 minute. The article was then reread at which time an M/#/200 microns of 3.36 was obtained. The article was again irradiated with ultraviolet light for 3 minutes, where upon the article was re-measured and an M/#/200 microns of 3.66 was obtained.

In this example, the recording of the hologram was done with a monomer that had a refractive index higher than the matrix, thus the $1^{st}$ reading of the hologram was possible. However, this example demonstrated the concept when the recorded article was irradiated with UV light, whereby the diffraction efficiency of the recorded holograms increased resulting in a larger measured M/#. Controls were run to insure that the M/# was not increasing with time or heat after the initial recording. Thus, the UV light activated the benzophenone so that the borate salt would bond with it (see figure below for the hypothesized reaction).

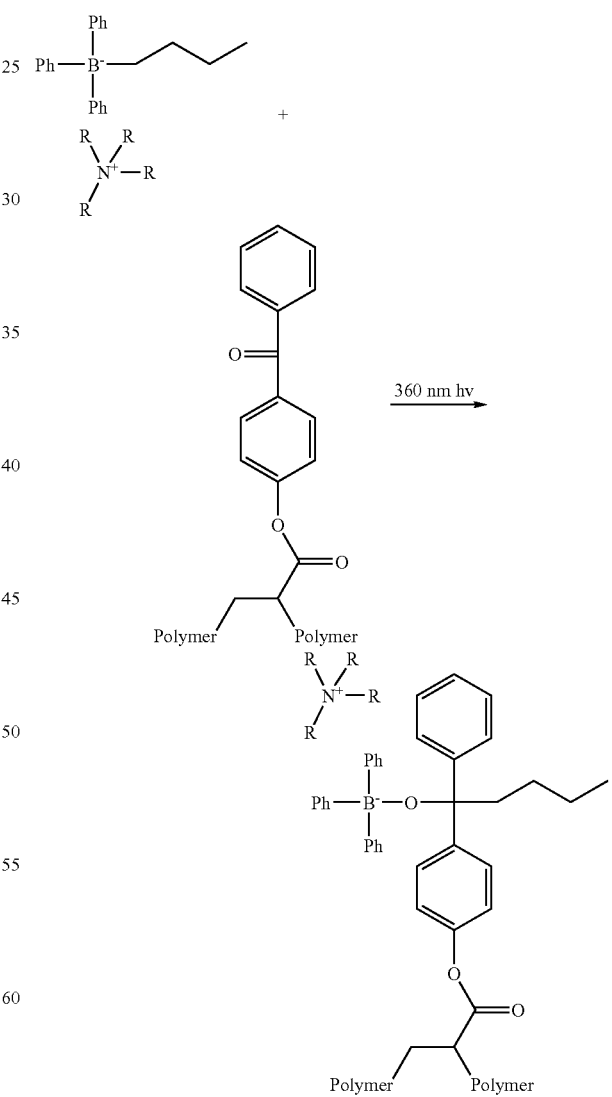

Other examples of Embodiment A include: (1) A thermoplastic matrix with pendent vinyl ether functionalities; a green sensitive photoinitiator; a tertiary amine acrylate (as monomer); a photoacid Generator sensitive in the blue (as developer). The above example would allow for holograms to be recorded (using green wavelengths) with very low initial diffraction efficiency; however, upon irradiation with blue light, an acid is generated which then bonds ionically to the tertiary amines on the photopolymer, which leads to a higher index contrast and an increased diffraction efficiency. (2) A cationically cured epoxy matrix; a red sensitive photoinitiator; an acrylate with pendent vinyl acetate functionality (as monomer); an acenaphthylene derivative (as a reversible developer). In this example, the photoinitiator initiates the monomer to form photopolymer with pendent vinyl acetate functionality. Then, irradiation with blue light causes the acenaphthylene derivative to cyclodimerize with the pendent vinyl acetate, thus increasing the refractive index of the photopolymer. Additionally, this example allows for the ability to reduce the refractive index of the photopolymer as well. Thus, a hologram or grating could be recorded, enhanced, erased, and restored multiple times. Such a product would have applications in security, labeling, decorative displays, latent coding, etc.

EMBODIMENT B

In this embodiment, the media comprises at least one of each of the following components: a matrix, a photoactive chemical which contains functionality to which the developer attaches upon activation, and a developer. A preferred method to manufacture media of embodiment B is as follows. Mix all chemical components together until homogeneous, then apply to substrate(s) or into mold(s). Optional packaging such as labeling, placing in a cartridge, etc. can then be performed. Substrates may already have antireflective coating, labels, or tracking patterns present.

A preferred method for exposing media of embodiment B is as follows. An article of media of Embodiment B is exposed to light, to which it is sensitive. During this light exposure, the photoactive chemical bonds to the matrix to chemically record the spatial light intensity; a hologram capable of being read may or may not be present at this stage. Once the exposure schedule is completed (which may include a blanket irradiation step in which any unused photoactive chemical is reacted as much as possible), then the area recorded to is exposed to an energy source (as the activation step) such that the developer is activated towards bonding with attachment sites from one or more of the photoactive chemicals. The developer(s) then increase the diffraction efficiency of the recorded spatial light intensity. Optionally, the media could be erasable and rewriteable.

In Embodiment B, the matrix functions as a mechanical support as well as providing reactive sites that allow for bonding of the photoactive chemical during irradiation at appropriate wavelengths. The matrix may be of any polymeric material assuming that all components are soluble with in the matrix. Additionally, the matrix may or may not be crosslinked. The photoactive chemical typically has two properties: 1) some or all of the photoactive chemical(s) have one or more attachment functionalities for the developer, and 2) the photoactive chemical (or mixture of chemicals) is capable of photoreactions such that they bond with the matrix (typically to reactive sites). The photoactive chemical should be paired with appropriate reactive site functionality. For example, if one uses photocycloaddition as a mechanism for bonding with the matrix, then the photoactive chemical could be an anthracene derivative while the reactive site could be a cyclobutadiene derivative (with which the anthracene photocyclodimerizes with upon irradiation at blue wavelengths). If chain transfer is the mechanism for bonding with the matrix, then the photoactive chemical could be a radical photoinitiator that upon irradiation generates two radicals, one of which chain transfers, the other of which terminates with the matrix radical. Thus, in this last scenario, the reactive site is a chain transfer functionality. Additionally, the matrix may contain vinyl ether, acrylate, or other vinyl group (as reaction sites) for incorporation of radical, cationic, anionic, or other reaction creating covalent bonding to the matrix. Many other photochemical reactions which accomplish bonding to the matrix are possible and are contemplated. Preferably, in this embodiment, the photoactive chemical(s), are of the same or slightly lower refractive index than the matrix; whereas the developer is of either higher or lower refractive index compared to the matrix. Preferably though, the developer is of higher refractive index than the matrix. More preferably, the developer has a refractive index that is greater than 0.1 than the refractive index of the matrix (for example, if the matrix is 1.45, then the developer has a refractive index of 1.55). Most preferably, the developer has a refractive index that is between 0.2 and 3.0 greater than the matrix. Upon an activation step, the developer bonds with the photoactive chemical(s) (or the fragments from the photoactive chemical(s)) that contain the attachment functionalities. The bonding of the developer to the attachment functionalities cause the refractive index of the matrix in that region to change, either higher or lower than before the activation step. Preferably, the bonding of the developer to that attachment sites leads to a higher refractive index. Additionally, other chemicals such as pigments, adhesion promoters, oxidizers, plasticizers, antioxidants, etc. may be present as may be needed for processing, identification, and aesthetics.

Preferably, the reactive site and photoactive chemical can be one or multiple of the following types: acrylate, vinyl ether, vinyl acetate, alkylene, styrene, vinyl amide, vinyl sulfide, acetylene, epoxide, coumarin, maleimide, fumarate, maleate, butadiene, anthracene, amine, carboxylic acid, acenaphthylene, ketone, anhydride, chain transfer agent, benzil, diketone, acetophenone, peroxide, and disulfide. Preferably, the photoactive chemical is one or a mixture of the following types: Mercaptan, disulfide, peroxide, triplet sensitizer, singlet sensitizer, photoinitiator, maleimide, anthracene, coumarin, acenaphthylene, benzophenone with amine, vinyl sulfide, ketone, anhydride, chain transfer agent, benzil, diketone, and acetophenone. Preferably, one or more, in whole or in part, of the photoactive chemical(s) contain attachment functionality. Preferably, upon irradiation of light to which the said photoactive chemical is sensitive, bonding of the said photoactive chemical to the matrix occurs.

A first variation of Embodiment B could have the following formulation: A thermoplastic matrix with pendent vinyl ether functionalities. (vinyl ether is the reactive site); a blue sensitive photoinitiator with pendent tertiary amine functionality (the photoinitiator is the photoactive chemical, while the amine is the attachment functionality); a photoacid generator (PAG) sensitive in the UV (wherein the PAG is the developer); and photoinert metal salts (an optional 2nd developer). This formulation would allow for a relatively weak hologram to be recorded when the photoinitiator (upon irradiation to which the photoinitiator is sensitive) bonds with the vinyl ether reactive sites on the matrix; yet upon activation with UV light, the acid generated from the PAG bonds with the amine forming an ionic salt. This raises the refractive index of the matrix at this location, thus increasing the diffraction efficiency of the hologram. Additionally, the amine-acid ionic salt in turn attracts the metal salts to form local concentrations of ionic species, thus further raising the refractive index.

A second variation of Embodiment B could have the following formulation: A cationically cured crosslinked epoxy matrix with pendant methacrylate functionalities (thermoset matrix with the methacrylate groups as reactive sites); a red sensitive photoinitiator with vinyl acetate pendant groups (the photoinitiator is the photoactive chemical and the vinyl acetate is the attachment functionality); an acenaphthylene derivative (as a reversible developer). In this formulation, the photoinitiator, upon irradiation of red wavelengths, attaches directly to the matrix via the methacrylate reactive sites. Then, for activation, irradiation with blue light causes the acenaphthylene derivative (the developer) to cyclodimerize with the pendent vinyl acetate, thus increasing the refractive index of that area. Additionally, this scenario allows for the reversible gain and loss of the refractive index modulation. Thus, after activation, the developer can be detached by irradiation at 290 nm. This process of development and erase can continue for many cycles. Such a scenario is well suited for storage of covert, authenticity, and similar types of information.

A third variation of Embodiment B could have the following formulation: A polyurethane crosslinked matrix with pendant vinyl ether functionalities (thermoset matrix with the vinyl ether groups as reactive sites); a green sensitive triplet sensitizer, a disulfide with tertiary amine groups (the photosensitizer is a component of the photoactive chemical, the disulfide is another component photoactive chemical and the tertiary amine is the attachment functionality); a blue sensitive photoacid generator (the developer). In this formulation, the recording step uses green light, whereby the triplet sensitizer causes the disulfide to homolytically cleave forming radicals which bond to the matrix via the vinyl ether reactive groups. The tertiary amine then functions as an attachment site for the PAG when irradiated with blue light.

A fourth variation of Embodiment B could have the following formulation: A polyurethane crosslinked matrix with pendant vinyl ether functionalities (thermoset matrix with the vinyl ether groups as reactive sites); green sensitive acenaphthylene derivative, further comprising cyclic diketones (the acenaphthylene is the photoactive chemical and the cyclic diketones are the attachment functionality); acrylates of high refractive index (the developer). The recording of the spatial light intensity occurs with irradiation at green wavelengths, whereby the photoactive chemical acenaphthylene bonds with the matrix via the vinyl ether reactive sites. The activation step involves irradiation at UV wavelengths, in which the cyclic ketone cleaves forming two matrix pendant radicals, with which the acrylate polymerizes forming high refractive index polymer attached to the matrix creating a spatial change in refractive index that matches the spatial light intensity originally used. Such a formulation would be good for data storage applications as well as photolithographic processes.

EMBODIMENT C

In this embodiment, the media comprises at least one of each of the following components: a photoactive matrix and a developer. A preferred method to manufacture media of embodiment C is as follows. Mix all chemical components together until homogeneous, then apply to substrate(s) or into mold(s). Optional packaging such as labeling, placing in a cartridge, etc. . . . can then be performed. Substrates may already have antireflective coating, labels, or tracking patterns already present.

A preferred method for exposing media of embodiment C is as follows. An article of media of Embodiment C, is exposed to light, to which it is sensitive. During this light exposure, the photoactive matrix records the spatial light intensity by forming active attachment sites; a hologram capable of being read may or may not be present at this stage. Once the exposure schedule is completed then the area recorded to is exposed to an energy source (as the activation step) such that the developer is activated towards bonding with the active attachment sites. The developer(s) then increase the diffraction efficiency of the recorded spatial light intensity. Optionally, the media could be erasable and rewriteable.

In embodiment C, the matrix functions not only as a mechanical support but also comprise latent attachment sites (in chain or pendant) that are activated by irradiation at appropriate wavelengths. As in the previous main embodiments, an activation step is needed to have the developer bond with the attachment site. The activation, again like previous main embodiments, involves the use of an energy source. The matrix may be of any polymeric material assuming that all components are soluble with in the matrix. Additionally, the matrix may or may not be crosslinked. The latent attachment sites are functionalities that are inert towards bonding with the developer, yet upon irradiation with light to which the latent attachment site is sensitive, become active toward bonding with the developer following/during an activation step. Choice of an appropriate latent attachment site should be made based on light sensitivity, reactivity towards the developer, and stability. In regards to reactivity towards the developer, the latent attachment site should remain inert towards bonding with the developer both before irradiation used for recording and even after activation, if that particular spatial location did not receive any light from the recording step. For example, in holography, a spatial light intensity profile is created upon two beams crossing in the media. The interference pattern generated from this beam crossing has both light and dark regions. The dark regions thus need to remain inert towards bonding with the developer even after the activation step. Of course, in any spatial region in which light has been present during the recording step, the latent attachment site becomes active (thus no longer latent) towards bonding with the developer upon an activation step. Another aspect of the latent attachment site functionality that is important is that the recording step create at least one active attachment site that is bonded to the matrix or at the very least, very slow to diffuse away as compared to the diffusion of the developer during the activation step. Otherwise, the recorded spatial light intensity profile will be blurred or lost all together.

As in Embodiments A and B, the activation step encompasses the use of an energy source to cause bonding of the developer to the attachment sites. Since the mechanism in this embodiment for the recording step does not necessarily involve mass transport, a weak photorefractive effect and possibly a weak absorptive effect may occur during the recording of the spatial light intensity. Yet, during the activation step, mass transport of the developer (which bonds with the active attachment sites) does potentially form a strong refractive index modulation (mimicking the original spatial light intensity profile). The developer is of either higher or lower refractive index compared to the matrix. Preferably though, the developer is of higher refractive index than the matrix. More preferably, the developer has a refractive index that is greater than 0.1 than the refractive index of the matrix (for example, if the matrix is 1.45, then the developer has a refractive index of 1.55). Most preferably, the developer has a refractive index that is between 0.2 and 3.0 greater than the matrix. The bonding of the developer to the attachment functionalities cause the refractive index of the matrix in that region to change, either higher or lower than before the activation step. Preferably, the bonding of the developer to the attachment sites lead to a higher refractive index. Additionally, other chemicals such as pigments, adhesion promoters, oxidizers, plasticizers, antioxidants, inhibitors, retarders, UV light absorbers, etc. may be present as may be needed for processing, identification, and aesthetics.

One aspect of Embodiment C which is different from previous main embodiments is that the optional flood-cure for bleaching after the record step should not be performed as this would activate all latent attachment sites, and thus destroy the spatial light intensity profile that was stored chemically during the recording step. However, after the activation step, the flood cure to bleach the latent attachment chromophores is once again optional (depending on the application).

Embodiment C could have the following formulation: A thermoplastic matrix with a Tg at least 50 C above room temperature and comprising pendant photoacid generators (the thermoplastic with the PAGs is the photoactive matrix, and the PAGs are the latent attachment sites); a high index multifunctional epoxide (the developer). In this formulation, the desired spatial light intensity profile is impinged onto the sample for the recording step, then heat is applied during the activation step which allows for the diffusion of the epoxide to the active reactive sites wherein bonding of the developer to the active attachment sites occurs.

A second variation on Embodiment C uses a blue light to record and a red light to activate the developer. For instance, using a matrix with a light labile protecting group for a primary amine pendant to the matrix as a latent attachment site that is sensitive to blue light (blue light causes the primary amine to be deprotected), allows one to use a green or red light sensitive dye (that has zero or very low absorption of blue light) attached to the matrix via a quatenary amine such that the quaternary amine (with epoxide functionality) cleaves forming a tertiary amine to become the freely diffusing developer. See below:

EMBODIMENT D

Any aspect of Embodiments A, B and C may be combined to create hybrid systems. It is also understood that many of the different components can be combined, such as having a monomer that also is capable of photoinitiation (such as benzophenone acrylate or maleimides), or perhaps, photoactive chemicals that cyclodimerize or free radically polymerize like a monomer (such as maleic anhydride), and thus, even though the various components are often described as individual molecules, it is understood that they may not always be individual molecules. It is also understood that combining any of the embodiments potentially leads to a media that is capable of recording spatial light intensity via two different mechanism (using potentially two independent wavelengths for recording) and potentially uses two different activation steps using either the same or different energy sources.

A first variation of Embodiment D could have the following formulation: A polymeric matrix with pendant photoinitiator; an acrylate with pendant tertiary amine (the acrylate is the monomer and the tertiary amine is the attachment functionality); and a photoacid generator (the developer). In this formulation, the photoinitiator is both the photoinitiator of photopolymerization of the monomer and the reactive site on the matrix. The record step creates matrix attached radicals which lead to matrix attached photopolymer. The activation step of UV irradiation leads to the bonding of the developer.

A second variation of Embodiment D could have the following formulation: A photoactive matrix with the latent attachment sites comprising photobase generators sensitive

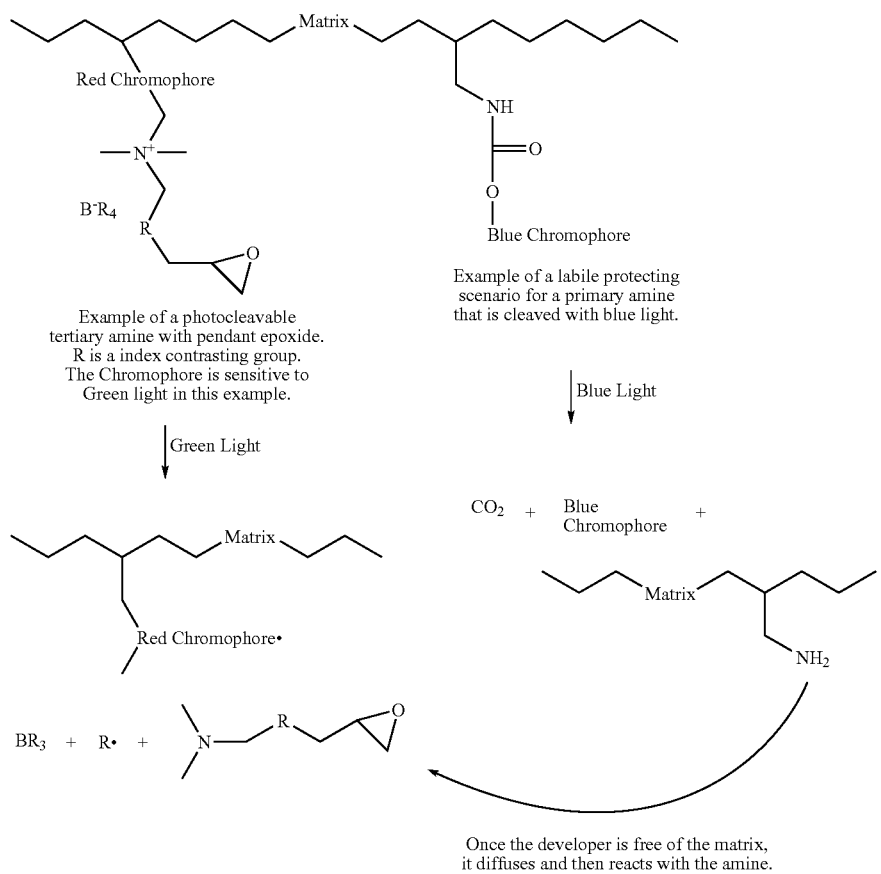

to green light by use of sensitizers (which produces a primary amine) and having a Tg 50 C above room temperature; an epoxide with a attachment functionality of vinyl ether; an acenaphthylene derivative (the developer). The PBG is irradiated with green light to record the spatial light intensity, then the sample is heated, which allows the epoxide to diffuse freely and thus react with the primary amine, thereby bonding with the matrix and polymerizing by base catalysis. Then, irradiation (while the sample is heated) with blue light causes the acenaphthylene derivative to bond to the vinyl ether. The definition of each component becomes blurred in such a mixed system since many of the components can be defined as two different things. For instance, the epoxide is both a developer and a monomer with attachment functionality; yet, the polymerization of the monomer occurs during an activation step, and further, a second activation stage is possible with irradiation of blue light to dimerize the acenaphthylene with the vinyl ether.

A third variation of Embodiment D could have the following formulation: A polyurethane crosslinked matrix with pendant or in-chain disulfide functionalities (thermoset matrix with the disulfide groups as reactive sites); a green sensitive triplet sensitizer, a vinyl ether with one or more tertiary amine groups in the same molecule (the photosensitizer is a component of the photoactive chemical, the vinyl ether is another component photoactive chemical and the tertiary amine is the attachment functionality); a blue sensitive photoacid generator (the developer). In this formulation, the recording step uses green light, whereby the triplet sensitizer causes the disulfide to homolytically cleave forming radicals which bond to the matrix via the vinyl ether reactive groups. The tertiary amine then functions as an attachment site for the PAG when irradiated with blue light. However, the vinyl ether may also be termed as a monomer, and the disulfide as a component of a photoinitiator (whereby the sensitizer is the other component).

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. This application discloses several numerical range limitations. The numerical ranges disclosed inherently support any range within the disclosed numerical ranges even though a precise range limitation is not stated verbatim in the specification because this invention can be practiced throughout the disclosed numerical ranges. The entire disclosure of the patents and publications referred in this application are hereby incorporated herein by reference.

What is claimed is:

1. A medium comprising:
   a polymer matrix,
   a monomer comprising an attachment functionality to which the developer attaches upon activation,
   a photoinitiator, and
   a developer,
   wherein the medium is capable of recording a latent hologram and the developer is capable of developing the latent hologram into a readable hologram by activation of the developer.

2. The medium of claim 1, wherein the latent hologram represents less than 10% of the final diffraction efficiency after developing.

3. The medium of claim 1, wherein the latent hologram represents 10% to 80% of the final diffraction efficiency after developing.

4. The medium of claim 1, wherein the medium comprises a non-photoactive matrix or a photoactive matrix, and the medium further comprises a material selected from the group consisting of an oligomer, a photoactive chemical and combinations thereof.

5. The medium of claim 1, wherein the activation of the developer comprises heat, light sonication, or particle radiation.

6. The medium of claim 1, wherein the activation of the developer is by exposure to light.

7. The medium of claim 6, wherein the activation of the developer by light is accomplished by a light of a different wavelength than a recording light wavelength.

8. A medium comprising:
   a polymer matrix comprising reactive sites,
   a photoactive chemical comprising attachment sites, and
   a developer,
   wherein the photoactive chemical bonds to the matrix reactive sites during recording and the developer bonds to the attachment sites of the photoactive chemical bonded to the polymer matrix during activation of the developer.

9. The medium of claim 8, wherein the activation of the developer comprises heat, light sonication, or particle radiation.

10. The medium of claim 8, wherein the activation of the developer is by exposure to light.

11. The medium of claim 10, wherein the activation of the developer by light is accomplished by a light of a different wavelength than a recording light wavelength.

* * * * *